May 31, 1932.  E. RICARD ET AL  1,860,554
MANUFACTURE OF ABSOLUTE ALCOHOL
Original Filed April 16, 1928
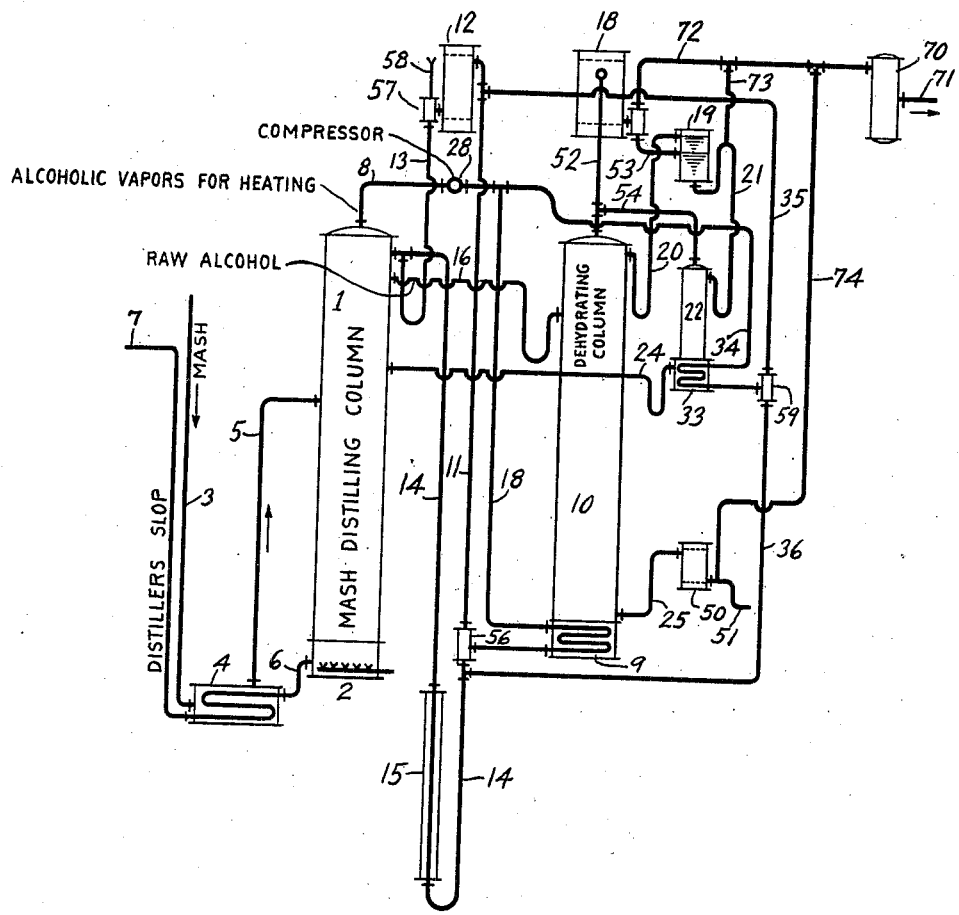

Patented May 31, 1932

1,860,554

UNITED STATES PATENT OFFICE

ELOI RICARD, PAUL SAVARIT, AND HENRI MARTIN GUINOT, OF MELLE, FRANCE, ASSIGNORS TO U. S. INDUSTRIAL ALCOHOL CO., OF NEW YORK, N. Y., A CORPORATION OF WEST VIRGINIA

MANUFACTURE OF ABSOLUTE ALCOHOL

Original application filed March 28, 1929, Serial No. 350,809, and in France April 3, 1928. Divided and this application filed October 24, 1930. Serial No. 490,840.

In our prior application Serial No. 270,337, filed April 16, 1928, we have disclosed an improvement in the manufacture of absolute alcohol from fermented mashes containing aqueous alcohol, having for its object an important reduction in the amount of steam required for heating, in order to reduce the cost of manufacture of the alcohol. In that application the heat of the alcoholic vapors issuing from the column used for distilling the mashes at a very high degree was utilized for heating the dehydrating column, either partially or entirely.

This was accomplished by conducting the alcoholic vapors leaving the top of the distilling column to a coil in the dehydrating column, and causing condensation to take place in this coil, so that the contents of the dehydrating column were heated indirectly by the sensible and latent heat relinquished by the vapors. The resulting condensate was returned to the mash distilling column and the uncondensed vapors were likewise condensed and returned to that column.

The temperature of the vapors passing from the distilling column when operating at atmospheric pressure is such that they can be employed in this way to heat about three-quarters of the dehydrating column, but the basal portion of this column must be maintained at a higher temperature and consequently, in one form of execution of the invention of our earlier application, a steam coil was provided for heating the lower part of the dehydrating column.

We also disclosed, however, that the entire heating of the dehydrating column (leaving out of account the heat contained in the raw alcohol to be dehydrated) could be supplied by the alcoholic vapors in the manner described, by maintaining the distilling column under a pressure sufficient to raise the temperature of the alcoholic vapors to the requisite degree.

We have discovered that we can realize a modification of the process if, instead of maintaining the distilling column under pressure we maintain all or part of the dehydration apparatus under a pressure less than atmospheric pressure, and preferably at a pressure sufficiently reduced so that the dehydrating column will operate at a temperature several degrees below 78° C. at the base. In this way the heat of the vapors circulated from and back to the distilling column can be made to suffice for heating the entirety of the dehydrating column and secondary column, or if the pressure in the dehydrating apparatus is lowered but a less extent, the amount of additional steam heating that may be required will be correspondingly reduced.

The accompanying drawing illustrates in diagram an apparatus for carrying out the present invention.

The distilling column 1 is heated by steam at 2. The fermented mash, for example a 7% (Gay Lussac) mash, to be distilled is supplied continuously through the pipe 3 and as in our former application becomes heated to 90° C. in a heat-exchange device 4, where it is heated by the distiller's wash which is discharged from the bottom of the distilling column at 6 and after being cooled in the heat-exchanger is conducted away through a pipe 7. The heated mash proceeds through a pipe 5 to the column 1.

Distillation in this column is conducted so as to produce high grade raw alcohol, preferably 95°–95.5° Gay Lussac, and this alcohol passes through the pipe 16 to the second distilling column 10, which is the dehydrating column. Here the alcohol is subjected to azeotropic distillation in the presence of a suitable water entrainer, such as benzol for example, with which this column is charged. The dehydrated or absolute alcohol is drawn off at the base of this column through a pipe 25 to a cooler 50 having a vented outlet pipe 51.

The vapors issuing from the top of the dehydrating column pass through the pipe 52 to a condenser 18, from which the condensate flows through a pipe 52 to a decanting apparatus 19, where it separates into two layers. The layer rich in entrainer is continually returned through a pipe 20 to the dehydrating column, while the liquid composing the other layer flows through a pipe 21 to a small column 22 where it is distilled to remove entraining liquid, the vapors of this liquid passing through a pipe 54 to the pipe 52 and thence to the condenser 18, to return thence to the dehydrating column 10. The liquid discharged from the bottom of the small apparatus 22 and which comprises alcohol and water is returned through a pipe 24 to the distilling column 10.

The alcoholic vapors issuing from the top of the column 1 through the pipe 8 are utilized for heating the dehydrating column 10 and also preferably the secondary or small column 22 in the manner previously referred to, and in accordance with the present invention the effect of these vapors in heating the dehydration apparatus is increased by maintaining the dehydrating column 10 or both this column and the secondary column 22 under a slight vacuum. According to the degree of the vacuum, the vapors will be made effective to heat the columns of the dehydrating apparatus more nearly to the bottom than would otherwise be the case, while by choosing a degree of minus pressure which enables the dehydrating column to operate at a temperature several degrees below 78° C. at the base it becomes possible to heat the entirety of the dehydrating apparatus, without any additional steam heat, and without operating the distilling column under pressure, or without compressing the vapors after they leave this column, as disclosed in our application Serial No. 350,809, filed March 28, 1929, of which this application is a division. However, the invention is not necessarily limited to the heating of the columns 10 and 22 in their entirety in this way, or to operation of the distilling column 1 at atmospheric pressure.

In order to maintain the dehydrating apparatus under sub-atmospheric pressure, a partial vacuum chamber 70 is provided, this chamber being connected by a line 71 with an exhausting pump not shown. This chamber is connected with the dehydrating system at suitable points. Thus, it is shown connected by pipes 72, 73 and 74 with vents in the conduits 53, 21 and 51.

The pipe 8 has branches 18 and 34 which conduct the alcoholic vapors to condensing and heating coils 9 and 33 in the base of columns 10 and 22, respectively, whereby the contents of these columns are heated by sensible and latent heat surrendered by the vapors.

The outlet of coil 9 is connected with a separator 56 from which there extend a vapor pipe 11 and a liquid-conducting pipe 14. Uncondensed vapors rise through the pipe 11 to a condenser 12, from which the condensate passes to a separator 57 having a vent 58 to the atmosphere and is returned through a pipe 13 to the distilling column 1.

The liquid condensed in the coil 9 is elevated by any suitable pump or lift 15 in the pipe 14 and is also returned to the column 1, all of the alcoholic vapors used for heating the dehydrating column being condensed and returned to the distilling column where the mash is distilled in continuous operation. The vapors and their condensate are thus circulated in a closed cycle between said distilling column and the heating coil which heats the mixture undergoing azeotropic distillation in the column 10 to remove the water from the alcohol and obtain anhydrous alcohol.

The outlet of coil 33 is connected with a separator 59, from which the liquid resulting from condensation in the coil flows through a pipe 36 to the pipe 14 and is returned by the lift device 15 to the distilling column 1. Vapors which pass through the coil 33 without being condensed rise through a pipe 35 and thence to the condenser 12, from which the condensate is returned to the column. Thus, as in the case of the vapors used for the heating of column 10, all the vapors utilized for the heating of column 22 are circulated in a closed cycle, are condensed and returned to the column where the mash is being distilled.

We claim:

1. A continuous process for the manufacture of absolute alcohol from dilute aqueous alcohol, which comprises distilling the dilute aqueous alcohol in one apparatus, and dehydrating the alcohol thus obtained in another apparatus, and heating the dehydration apparatus by circulating alcoholic vapors from the first distilling apparatus so that they condense in indirect heat-exchange relation with the contents of the dehydration apparatus and return to the first distilling apparatus, which process is further characterized in that the dehydration apparatus is maintained at least in part under sub-atmospheric pressure in order to increase the effect of the alcoholic vapors for heating the dehydration apparatus.

2. A continuous process for the manufacture of absolute alcohol from dilute aqueous alcohol, which comprises distilling the dilute aqueous alcohol in one apparatus, and dehydrating the alcohol thus obtained in another apparatus, and heating the dehydration apparatus by circulating alcoholic vapors from the first distilling apparatus so that they condense in indirect heat-exchange relation with the contents of the dehydration apparatus and return to the first distilling apparatus, which process is further characterized in that the dehydration apparatus is maintained at least in part at a pressure sufficiently below atmospheric pressure so that the alcoholic vapors suffice for heating such apparatus without additional heating.

ELOI RICARD.
PAUL SAVARIT.
HENRI MARTIN GUINOT.